(12) United States Patent
Nagata et al.

(10) Patent No.: US 6,527,187 B1
(45) Date of Patent: Mar. 4, 2003

(54) CARD READER

(75) Inventors: Shigeyuki Nagata, Nagano (JP); Kazunori Takahashi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/475,429

(22) Filed: Dec. 30, 1999

(30) Foreign Application Priority Data

Jan. 4, 1999 (JP) .............................. 11-000045
Dec. 2, 1999 (JP) .............................. 11-343861

(51) Int. Cl.[7] .............................................. G06K 13/00
(52) U.S. Cl. ........................ 235/475; 235/492; 235/380
(58) Field of Search ........................ 194/217; 235/475, 235/380, 492, 479, 449, 379

(56) References Cited

U.S. PATENT DOCUMENTS

| 4,111,018 A | * | 9/1978 | Pilvet | 70/352 |
| 5,079,413 A | * | 1/1992 | Sasaki | 235/479 |
| 5,256,867 A | * | 10/1993 | Chen | 235/449 |
| 5,637,859 A | * | 6/1997 | Menoud | 235/492 |
| 5,799,767 A | * | 9/1998 | Molbak | 194/217 |
| 5,905,252 A | * | 5/1999 | Magana | 235/475 |
| 5,949,047 A | * | 9/1999 | Abe et al. | 235/435 |
| 6,047,807 A | * | 4/2000 | Molbak | 194/217 |
| 6,070,802 A | * | 6/2000 | Yi | 235/475 |
| 6,149,064 A | * | 11/2000 | Yamaoke et al. | 235/479 |
| 6,186,401 B1 | * | 2/2001 | Magana | 235/475 |
| 6,213,392 B1 | * | 4/2001 | Zuppicich | 235/380 |

FOREIGN PATENT DOCUMENTS

| EP | 1 018 693 A2 | 7/2000 |
| JP | 410171937 | * 6/1998 |

* cited by examiner

Primary Examiner—Michael G. Lee
Assistant Examiner—Allyson Sanders
(74) Attorney, Agent, or Firm—Reed Smith LLP

(57) ABSTRACT

A card reader has an opening at the base thereof in communication with the card insertion slot and forward of the IC contacts of the contacts carriage. When foreign materials such as coins are inserted into the card passageway, they are discharged through this bottom opening without contacting or causing damage to electronic contacts and without building up in the reader. Further, a blocking mechanism for the card passageway prevents foreign material such as coins from being inserted. When a read head senses the magnetic swipe of a card as the card is initially inserted, the blocking member is pivoted out of the way.

11 Claims, 6 Drawing Sheets

CARD READER

BACKGROUND OF THE INVENTION

This invention relates in general to a card reader having arrangements that protect the card reader mechanism from the insertion of extraneous matter such as coins.

Card readers that accept cards which are inserted in a horizontal plane are known to include an opening at a bottom surface to divert extraneous foreign matter such as coins which might be inserted into the card receiving slot.

The type of opening provided along the bottom surface of such readers for horizontally inserted cards cannot be employed effectively for a card reader that is designed to accept cards which are inserted in a vertical plane.

One problem in these vertical card reading arrangements is that the coins or other foreign matter may hit and damage electronic components such as the IC contacts which are employed for reading the IC circuits on cards containing such.

The coins or other foreign matter may remain inside the card reader and can either be lodged at a point or built up to a point where they will damage the cards that are being inserted.

Accordingly, it is a major purpose of this invention to provide a card reader with a device that protects the reader from damage through the insertion of coins or other foreign matter.

It is a particular purpose of this invention to provide a card reader which is particularly adapted to provide such protection in designs where the card reader accepts cards that are manually inserted in a vertical plane.

It is a related purpose of this invention to provide the above objects in a simple configuration in which the unwanted foreign matters such as coins will be prevented from damaging the interior of the coin reader and will be blocked or discharged easily and with certainty.

BRIEF DESCRIPTIONS OF THE DRAWINGS

FIGS. 2 and 3 are at a scale about 1.4 times larger than the scale of FIG. 1.

DESCRIPTION OF THE PREFERRED EMBODIMENTS

Figure 1:
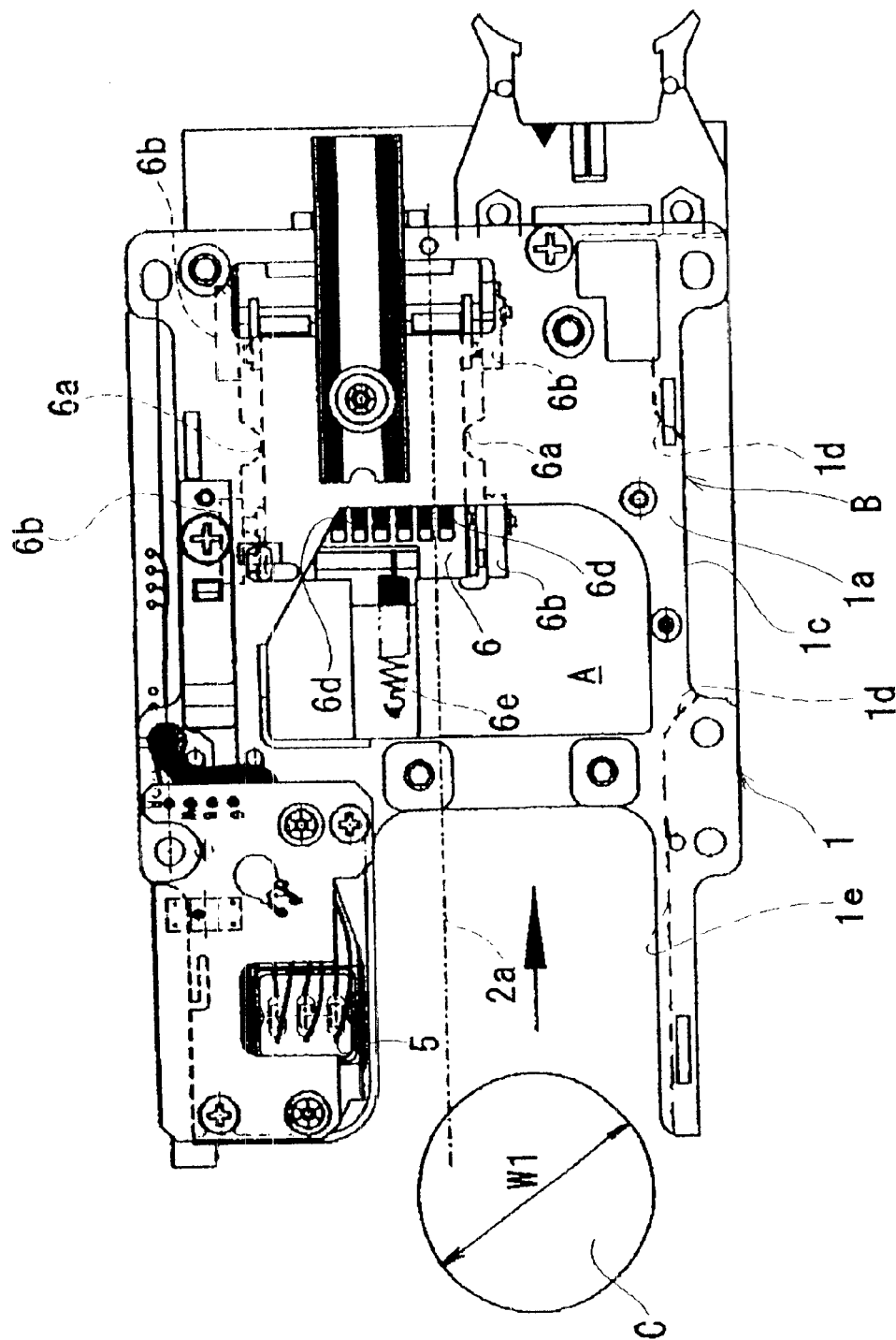
FIG. 1 is a side view of a first embodiment of a manual card reader of the present invention. This is a right side view of FIG. 3.
Figure 2:
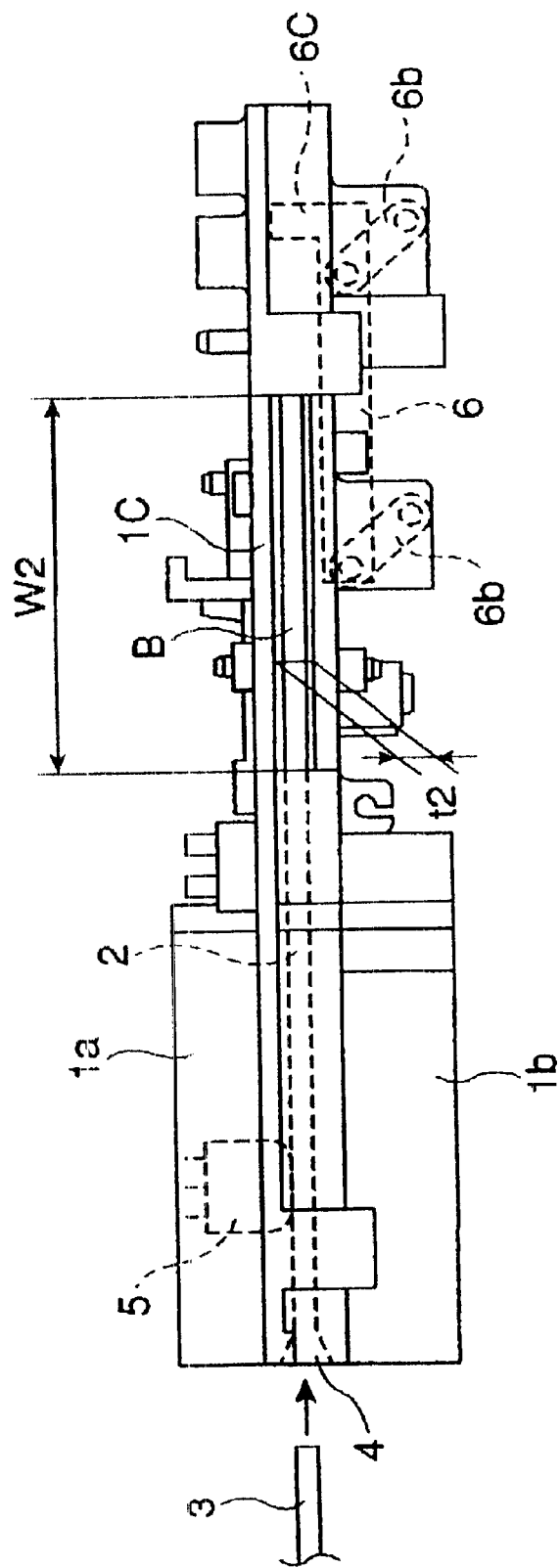
FIG. 2 is a bottom view of the FIG. 1 embodiment.
Figure 3:
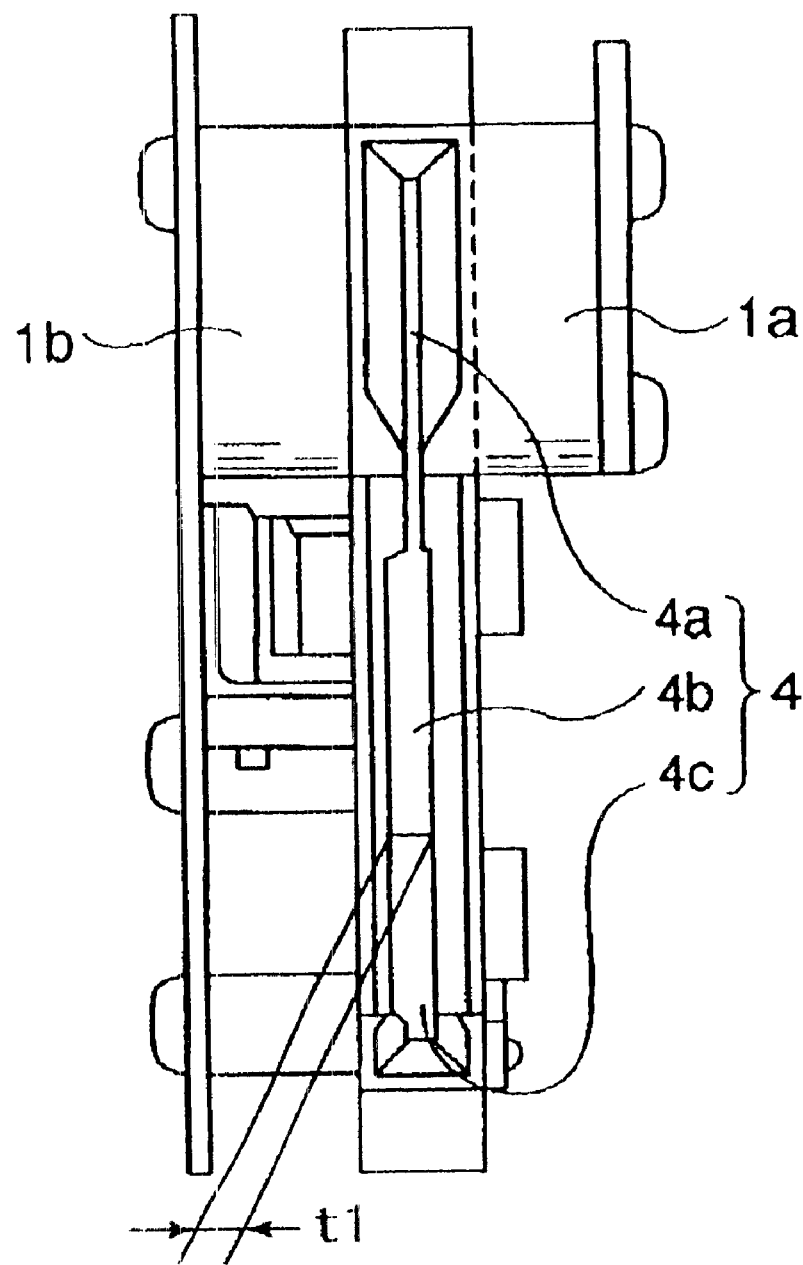
FIG. 3 is a front view of the FIG. 1 embodiment, showing the card inlet.

A First Embodiment (FIGS. 1–3)

FIGS. 1 through 3 show a manual card reader of an embodiment of the present invention. The embodiment described is an IC card reader having a magnetic head. Further, the present embodiment is configured in a vertical arrangement in which an IC card is vertically inserted.

The IC card reader has a pair of frames 1a, 1b which are engaged with one another to provide a card passageway 2. The card passageway 2 is a thin passageway tall enough to accept the card and which guides the IC card 3 in right and left directions as seen in FIGS. 1 and 2. At the front of the card passageway 2 (left side in FIG. 1), the card inlet 4 includes a pair of tapered surfaces that taper out toward the outside of the device.

As shown in FIG. 3, the card inlet 4 is formed vertically. A pair of narrow inserting portions 4a and 4c are provided at top and bottom ends of the card inlet 4. A slightly wider inserting portion 4b is provided between the narrower inserting portions 4a and 4c. Each of the narrower inserting portions 4a and 4c has a small gap (width) dimension corresponding to the thickness of the IC card 3 to accept the top portion and bottom edge of the IC card 3. The narrower inserting portion 4a positioned at the top side has a length of about half of the entire length (vertical direction in the figure) of the card inlet 4. The narrow inserting portion 4c at the bottom in the figure is extemely short. The wider d1 inserting portion 4b is formed with a gap dimension slightly wider than the narrower inserting portion 4a so as to accommodate any warping or bending of the IC card 3. The length of this portion 4b is close to half of the entire length (vertical direction in the figure) of the card inlet 4.

In one embodiment, the inlet 4 has a height of approximately 55 mm, the portion 4a is approximately 29 mm long, and the portion 4b is approximately 24 mm long. The portion 4c is between one and two mm long. In that embodiment, the portion 4a is 1.2 mm wide, the portion 4b is 2.45 mm wide and the portion 4c is 1.45 mm wide. This is sufficient to accept most warped cards.

In the vicinity of the card inlet 4, a magnetic head 5 for reading information in a magnetic stripe on the IC card 3 is positioned in the upper portion of the card passageway 2. The magnetic head portion 5 also functions as a sensing means for sensing the insertion of the IC card 3 by detecting the presence of the magnetic stripe or magnetic data which is on the IC card 3.

Further, a contacts carriage 6 that moves upon the insertion of the IC card 3 is positioned at the far end of the card passageway 2 in the card insertion direction (right side of FIG. 1). The contacts carriage 6 is mounted so as to move back and forth in the card transporting direction with respect to an opening (not illustrated) provided at one of the pair of frames 1a and 1b. The carriage position shifts upwardly from a center line 2a in the card width direction (vertical direction in FIG. 1) of the card passageway 2. The carriage is configured to move upon the insertion of the IC card 3 while controlling the position thereof relative to a predetermined reference surface 6a. More specifically, the contacts carriage 6 is mounted on the frame 1b by a parallel link mechanism 6b, consisting of two identical links, and arranged so as to move back and forth in the card transporting direction, and to stay parallel to the card passageway 2. It is also capable of moving diagonally.

At the front side portion of the contacts carriage 6 in the card insertion direction, there is a key-shaped card contacting portion 6c. The front end of the IC card 3 contacts the portion 6c, which projects across the card passageway 2. A plurality of contacts 6d are mounted on an elastic member and contact the contact pattern on the IC card 3 when the card is inserted. The contacts 6d which record and reproduce data by contacting the IC card 3 are arranged on one side of the surface of the contacts carriage in multiple lines along the card transporting direction.

Upon the manual insertion of the IC card, the front edge of the IC card 3 contacts the card contacting portion 6c of the contacts carriage 6. This causes the contacts carriage to move parallel to the IC card 3 inside the card passage 2 shortening the distance that brings the points of the contacts 6d into contact with the contact pattern on the IC card 3 and to release the points of the contacts 6d from the contact pattern on the IC card 3 when moving in the reverse direction.

In addition, the contacts carriage 6 is energized in the card insertion direction (to the left in FIG. 1) of the card passage 2 by an energizing means of a coil spring 6e. When the IC card 3 is not inside the card passage 2, the contacts carriage 6 stands by at a predetermined non-contact position.

On a sidewall surface of the frame 1a which faces the contacts carriage 6, that is, a surface which faces a flat surface of the IC card 3, an opening A for discharging foreign matter such as a coin C is formed. The opening A is provided, in case the card reader is constructed not in a vertical arrangement like the present embodiment but in a horizontal arrangement, to discharge foreign matter such as coin C inserted inside the card passageway 2, and formed to let the card passageway 2 communicate to the outside.

The foreign matter discharge opening A is formed to have an opening area slightly larger than the size of the coin C having the largest diameter in the currently used coins; therefore, the coins C having different diameters inserted in the card passageway 2 are all discharged to the outside. Also, the foreign matter discharge opening A is positioned between the card inlet 4 and the contacts carriage 6 in the card insertion direction so that foreign matter inserted in the card passage is discharged outside before contacting electronic components such as IC contacts.

A frame bottom surface 1C lower than the center line 2a of the card passage 2 is positioned so as to face the bottom edge of the IC card 3. On a card-edge-facing wall 1e which constitutes the frame bottom surface 1c, a long, thin opening for discharging foreign matter B that extends along the card passage 2 is formed such that it lets the card passage 2 communicate with the outside via tapered surfaces 1d, 1d provided at the card-edge-facing wall. The foreign matter discharge opening B is for a device of a vertical arrangement type like this embodiment. As illustrated in FIG. 2, the width dimension, W2, along the card passage 2 is set longer than the outer diameter, W1, of the coin C which has the largest diameter in the currently used coins. Thus, all kinds of coins C likely to be inserted in the card passage 2 will be discharged outside through the foreign matter discharge opening B.

Also, the foreign matter discharge opening B is formed to have a gap dimension, t2, equal to or larger than the gap dimension, t1, of the wider in inserting portion 4b of the card inlet 4. Thus, all kinds of coins inserted in card passage 2 through the wider inserting portion 4b of the card inlet 4 are discharged outside.

The foreign matter discharge opening B is positioned between the card inlet 4 (left side in FIG. 2) and the contacts carriage 6 in the card insertion direction (right side in FIG. 2) so that foreign matter inserted in the card passage 2 is discharged toward the outside before contacting electronic components such as IC contacts.

In the IC card reader of this embodiment, foreign matter such as coins inserted in the card passage 2 through the card inlet 4 moves toward the opening B provided at the frame bottom surface 1c to which the foreign matter drops naturally, and the opening B is located before the contacts carriage 6 in the insertion direction; therefore, foreign matter will be discharged toward the outside of the device with certainty before contacting electronic components such as IC contacts.

When foreign matter such as coin C is inserted, it tends to come through the wider inserting portion 4b of the card inlet 4. Since the foreign matter discharge opening B has a gap dimension, t2, that is larger than that of the widener inserting portion 4b, all foreign matter inserted to the device will be discharged outside through the foreign matter discharge opening B.

In this embodiment, the foreign matter discharge openings A and B are respectively provided at the side surface of the frame 1a and the bottom surface of the frame 1b. Therefore, no matter which arrangement type, vertical or horizontal, the IC card reader is, the foreign matter discharge opening A or B is provided on the frame wall surface to which foreign matter such as coin C, inserted into the device through the card inlet 4, drops, thus discharging the foreign matter.

Moreover, in this embodiment, since the gap dimension, W1, of the foreign matter discharge openings A and B is set larger than the outer diameter W1 of the coin C having the largest diameter in currently used coins, the coin C inserted inside the device as foreign matter will always be discharged outside.

Note that, although the above mentioned embodiment is an example of the preferred embodiments of the present invention, the present invention is not limited to this, but can be variously modified within the scope of the present invention. For example, the above mentioned embodiment is a manual card reader of a vertical arrangement type. However, it may be of a horizontal arrangement type or can be applied to a card reader in which cards are transported by a motor.

Figure 4:
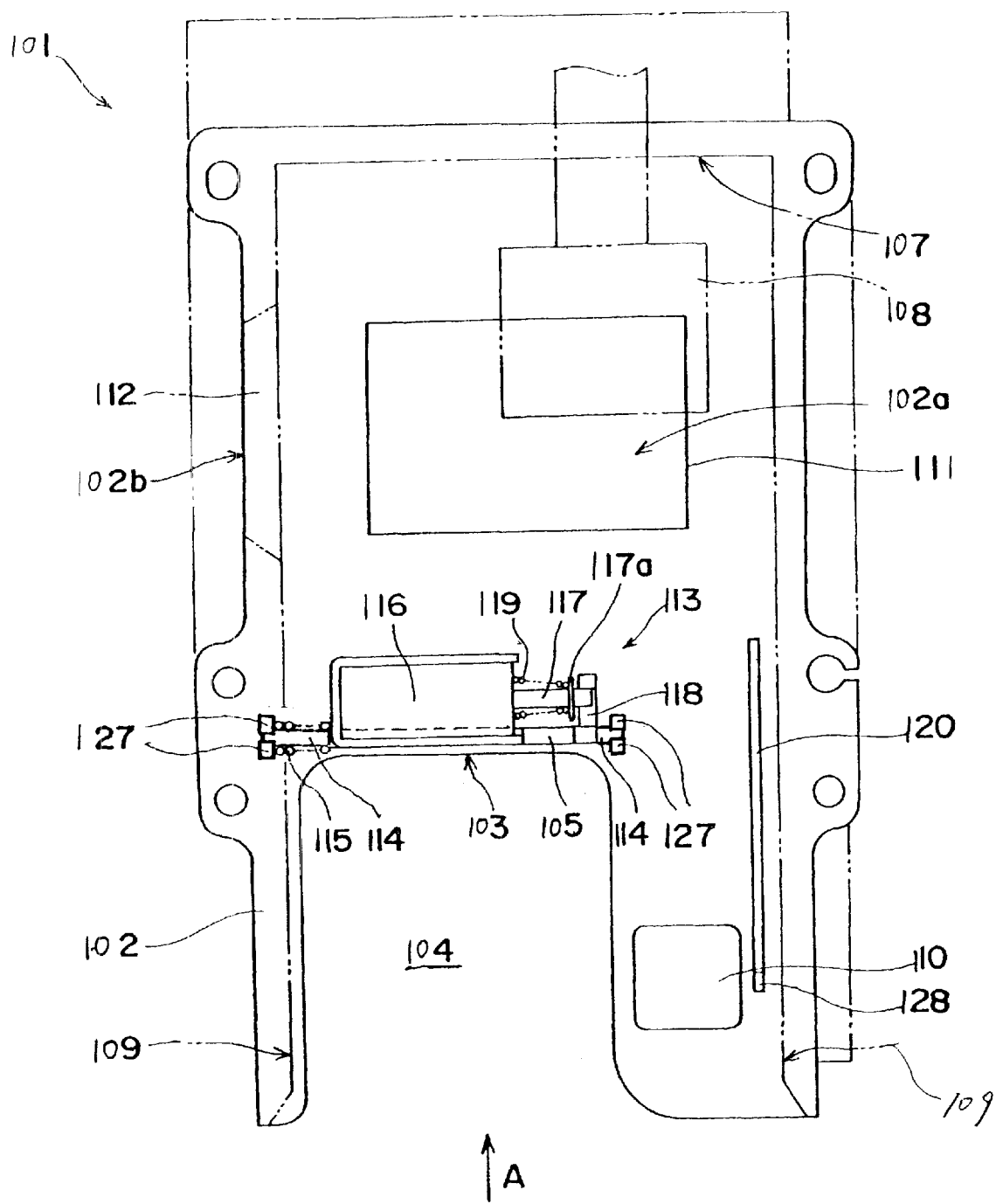
FIG. 4 is a plan view of a second embodiment of a card reader of the present invention.
Figure 4:
Figure 5:
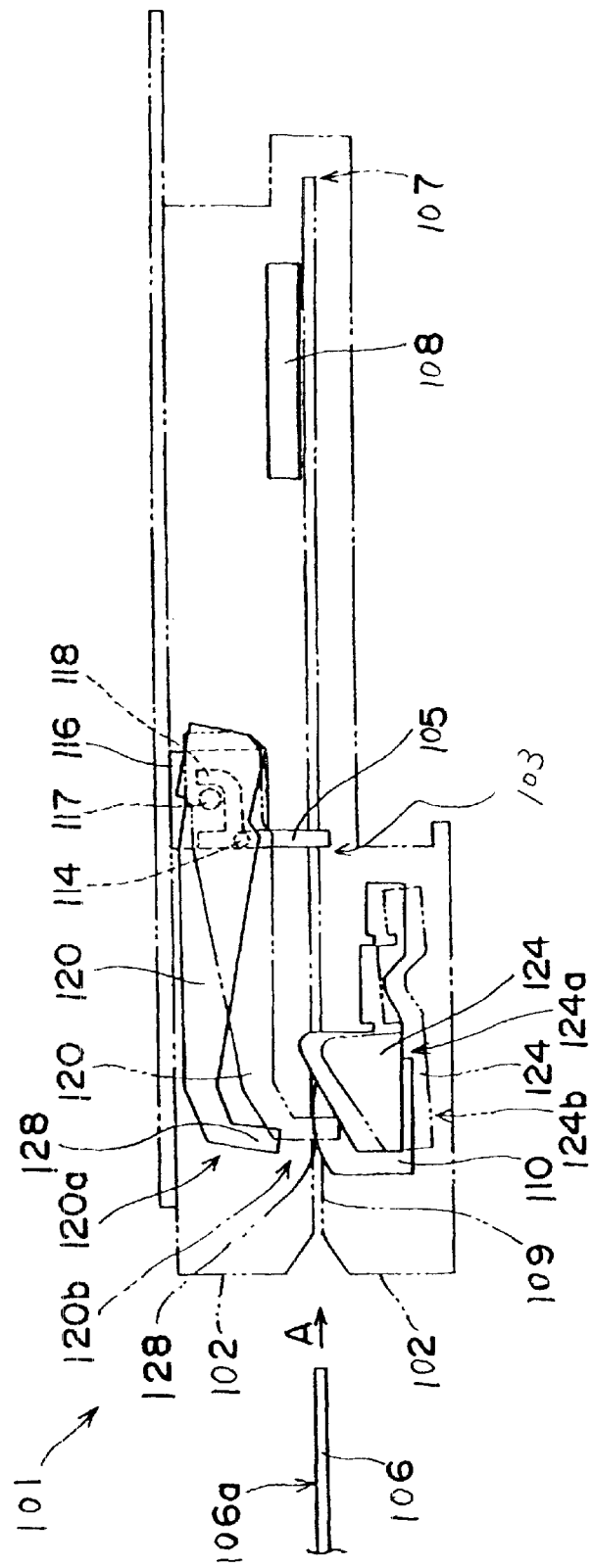
FIG. 5 is a side view of the FIG. 4 embodiment.
Figure 6:
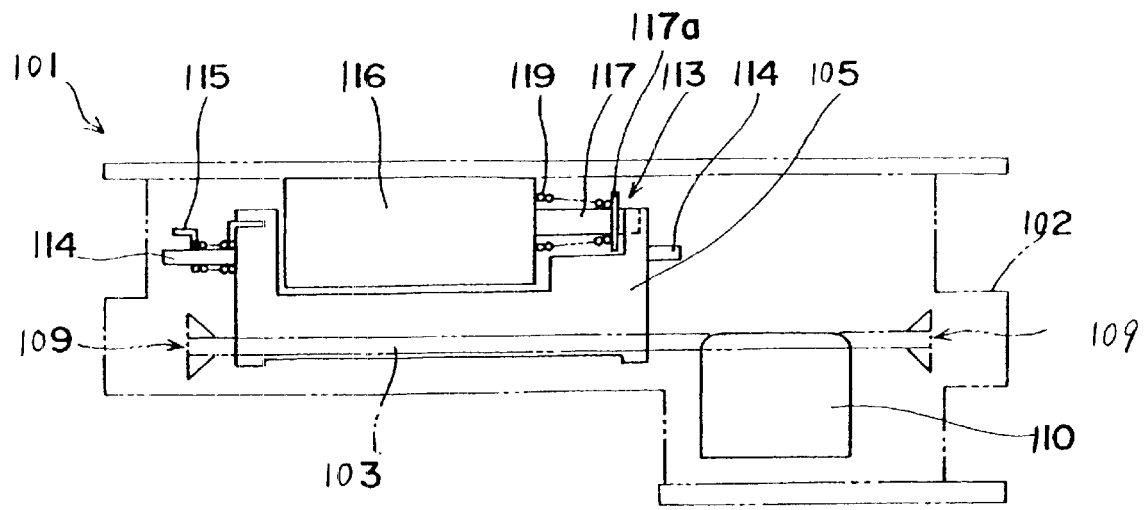
FIG. 6 is a front view of the shutter member and associated solenoid of the FIG. 4 embodiment.

A Second Embodiment (FIGS. 4–6)

FIGS. 4 through 6 show a further embodiment of a card reader 101. The card reader 101 includes a recess 104 for receiving cards 106. A card 106 is inserted in the direction shown by arrow A. After being read, the card is removed by a reverse motion. The frame 102 has a card inlet slot 103 with a flared mouth to facilitate card insertion. When the card is fully inserted, it is inserted to the stop 107 at which the forward edge of the card contacts an engaging surface on the frame 102. The card reader 101 includes a shutter member 105 to prevent coins and other extraneous items from entering the card reader. The recess 104 in the frame 2 facilitates hand insertion and removal. The portions 109 at both sides of the recess 104 aid in guiding insertion of the card.

The card inlet slot 103 extends around the recess 104. The card 106 which is to be read by the card reader 101 may be an IC card having a magnetic stripe and/or an IC chip.

The card reader 101 includes features to read the information on the card. These features include a contact block 108 for the IC chip and a magnetic head 110 for reading magnetic data on the card 106. The magnetic head 110 also functions as a detecting means for detecting the insertion of the card 106 by detecting the magnetic data on the card 106.

The contact block that reads the IC chip on the IC card is positioned near the distal end of the inlet slot 103 close to the stop 107.

The shutter member 105 normally closes the card inlet slot 103. Magnetic head 110 is provided near one of the guide portions 109 in front of or proximal of the shutter 105. The shutter 105 is rotatably mounted to a support shaft 114 which in turn is mounted to the frame 102. As illustrated in FIG. 6, a coil spring 115 is attached to the shaft 114. When the shutter 105 is unlocked and the card 106 is inserted, the shutter member 105 rotates against the spring force of the coil spring 115 to receive the card into the reader. When the card 106 is removed, the shutter member 105 returns to its original position by the force of the coil spring 115.

The blocking part 128 of the shutter 120 is positioned to prevent coins and other foreign matter from entering when the card 106 is not inserted. The shutter actuating element 105 engages a tip of a plunger 117. Plunger 117 is part of the disabling or canceling means 113 which, upon detection of the card, rotates the shutter out of the way so that the card can enter and which otherwise prevents shutter rotation when the card is not detected. The tip of the plunger 117 functions as a control to prevent the shutter actuating element 105 from moving into a disabling state when no card is present. The mechanism 113 for disabling the block can be constructed with a solenoid 116 inside the reader 101. The plunger 117 attached to the solenoid 116 is moved back and forth by the solenoid 116.

When the card 106 is not inserted, the tip of the plunger 117 engages a stopper in the shutter actuating element 105 so that the shutter is prevented from rotating. The shape of the stopper element 118 is not particularly limited as long as the shutter is prevented from rotating. The stopper element 118 locks the shutter only in the insertion direction.

Further, other than the stopper piece 118, a stopper piece which locks the shutter member 105 in both the card insertion direction and the reverse direction may be used. The stopper piece is not limited to one which completely locks the shutter member 105 so as not to move at all, but some rotation may be allowed as long as it prevents foreign matter from entering.

The solenoid 116 is fixed to the frame 102. A twisted coil spring 119 for returning the shutter member is provided around the plunger 117 to bias the plunger 117 in the projecting direction (to the right in FIG. 4) by pushing on a stopper ring 117A on the plunger 117. Therefore, the plunger 117 is projected by the spring force of the twisted coil spring 119 to return the shutter member when the solenoid 116 is not energized, i.e., at OFF state. On the other hand, when solenoid 116 is energized, i.e., at ON state, the plunger 117 is attracted into the solenoid 116 due to electromagnetic force, and tip of the plunger 117 and the stopper piece 118 are disengaged.

When the magnetic head 110 detects the presence of the card 106 having magnetic data, the solenoid is turned on and plunger 117 is attracted to the solenoid 116. Accordingly, the stopper piece 118 is unlocked and the shutter member 105 becomes rotatable. When the card 106 is removed, the solenoid is turned off, the plunger 117 is returned to the original position and locks the stopper piece 118 again.

As illustrated in FIG. 6, a portion of the shutter member 105 is notched according to the shape of the solenoid 116 and the mounting position of the solenoid so that the shutter member 105 and the solenoid 116 main body do not interfere with each other to restrict the rotation of the shutter member 105.

The manual card reader 101 is provided with a card locking member 120 which locks the card 106 so that it cannot be removed while data is being read by the contact block for IC card 108. The card locking member 120 is arranged to move between a stand-by position 120a shown by a solid line in FIG. 5 and a detecting position 120b shown by a two dotted line. For example, until a detecting switch (not illustrated) detects that the card 106 has reached the card stopping position 107, the card locking member stays at the stand-by position 120a. Upon detection of the card reaching the card stopping position 107, the card locking member 120 is moved to the detecting position 120b through a solenoid (not illustrated) to lock the card 106. Upon completion of data reading, the solenoid (not illustrated) is turned off so that the card locking member 120 returns to the stand-by position 120a to enable the card 106 to be removed.

In the frame 102, foreign matter discharge openings 111 and 112 are provided at a plane 102a parallel to a reading surface 106a of the inserted card 106 and a plane 102b perpendicular to the reading surface 106a of the card 106. For this reason, no matter which arrangement, horizontal or vertical, of the manual card reader 101, any foreign matter such as a coin is inserted into the manual card reader 101, can be discharged.

The operation of the manual card reader 101 configured as above will be described.

When the card 106 is not inserted, the shutter member 105 in the manual card reader 101 is locked from rotating by the stopper piece 118 and plunger 117. Consequently, even if one tries to insert foreign matter other than cards into the manual card reader 101 through the card inlet 103, the insertion will be prevented.

When the card 106 is inserted along the guide portions 109, first the magnetic head 110 detects magnetic data and the solenoid 116 is electrified. With this, the plunger 117 is attracted to the solenoid, the engagement thereof with the stopper piece 118 is canceled, and the shutter member 105 becomes rotatable. The card 106 is inserted up to the card stopping position, pushing the shutter member 105 to open against the spring force of the twisted coil spring 115.

When the detecting switch (not illustrated) detects that the card 106 has reached the card stopping position 107, the card locking member 120 is moved by the solenoid (not illustrated) to the detecting position 120b to lock the card 106 in place. At this position, the contact block for IC card 108 contacts the card 106 to read data on the card. After data is read, the solenoid is turned off so that the card locking member 120 is returned to the stand-by position 120a to enable the card 106 to be removed.

Upon completion of data reading, the card 106 is removed. With the removal of the card 106, the shutter member 105 is closed with the spring force of the twisted coil spring 115. When the card 106 is removed completely from the manual card reader 101, the solenoid is turned off and the plunger 117 is returned to the original position. The shutter member 105 is again locked with the engagement between the plunger 117 and the stopper piece 118.

As described above, even when one tries to insert foreign matter other than the card 106, since the shutter member 105 is locked from rotating, the foreign matter is prevented from entering the card reader 101.

Although the above embodiment is an example of the preferred embodiments of the present invention, the present invention is not limited to this, but is variously modifiable within the scope of the invention.

For example, the shutter member 105 in this embodiment closes the portion of the card inlet 103 facing the recess portion of the card passageway. The card inlet 103 is wide compared to the guide portions 109 to accommodate a warped card. The shutter member may be extended to the guide portions 109 to close the entire card passageway.

Figure 7:
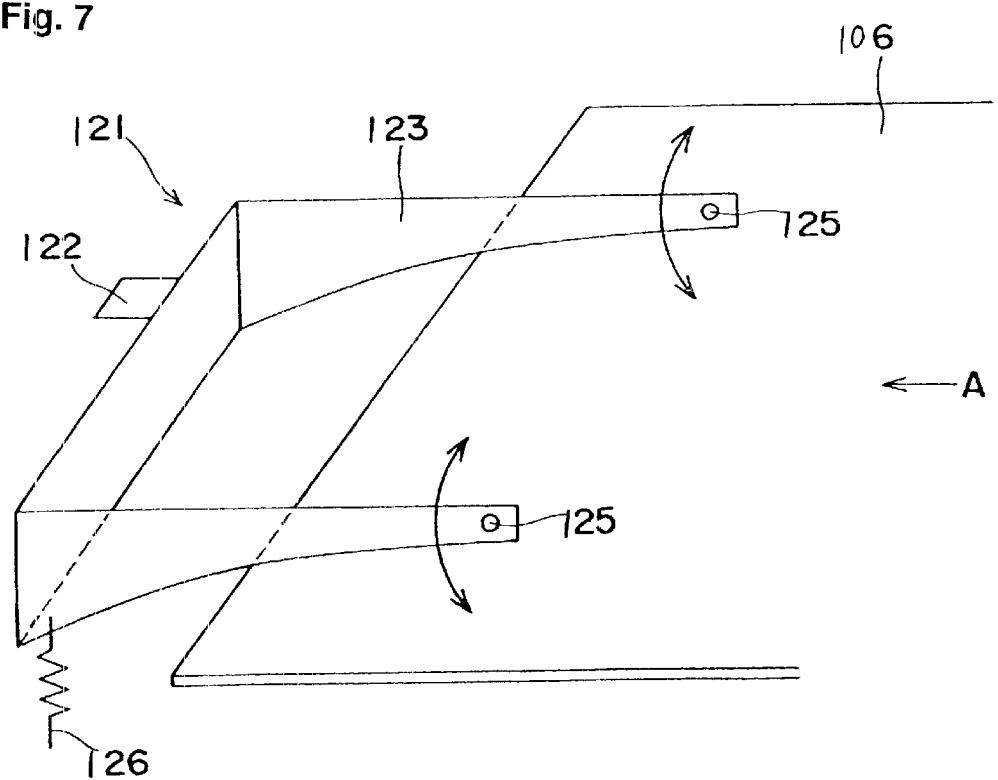
FIG. 7 is a perspective view of an alternate shutter member that can be employed in a FIG. 4 type embodiment.

The FIG. 7 Shutter

A shutter member 121 illustrated in FIG. 7 can be used as an example in which the shape of the shutter member 105 is modified. The shutter member 121 is arranged such that a rotation axis 125 of the shutter member 121 is positioned on the card incoming side to close the card inlet 103. The same solenoid 116 and plunger 117 as those in the above embodiment can be used for the foreign matter insertion prevention by the shutter member 121 and cancellation of the previously mentioned prevention. In this case, in the same manner as the above embodiment, a stopper piece 122 is unlocked only when an appropriate card 106 is inserted, and the shutter member 121 becomes rotatable. The shutter member 121 is formed with support arms 123 that are tapered along the card insertion direction (the direction A) so that the shutter rotates clockwise as the arms ridge on the leading edge of the card 106. For this reason, when the manual card reader 101 is installed in a horizontal arrangement, the shutter member 121 returns to the original position by gravity upon removal of the card 106. The shutter member 121 can be configured to return to the original position with the spring force of a spring member 126. By configuring the shutter member 121 to return to the original position using the spring member 126, the shutter member 121 can be returned to the original position with certainty in the manual card reader 101 not only in a horizontal arrangement, but also in a vertical arrangement.

The detecting means for detecting the card insertion is not limited to the magnetic head 110. For example, the detecting means may be configured with a triangle lever 124 as illustrated in FIG. 5. The triangle lever 124 can be configured movable to the stand-by position shown by a two dotted line and returnable to the original position shown by a solid line according to the card 106 inserted and removed, and positioned at the guide portions 109 and before the shutter member 105 in the card insertion direction. When the triangle lever 124 moves, the insertion of the card 106 can be detected. Further, the detecting means of the triangle lever 124 can be combined with the detecting means of the magnetic head 110.

Although the plunger 117 inserted in the solenoid 116 is engaged with the stopper 118 to lock the shutter member 105 in the above description, the stopper piece 118 may be omitted and the shutter member 105 be locked directly by the plunger 117.

The shutter member 105 may also be opened and closed directly by an actuator such as a solenoid.

Recapitulation of the Invention

As understood in the above description, the present invention is configured such that, in a manual card reader of a vertical arrangement type, an opening for discharging foreign matter is provided at a bottom surface of a frame to which foreign matter such as coins inserted into the device by the card inlet drops, and the foreign matter discharge opening is positioned before a contacts carriage in the card insertion direction to discharge the foreign matter toward the outside of the device before the foreign matter touches electronic components such as IC contacts in the same manner as that of a horizontal arrangement type. Therefore, even when the present invention is applied to a card reader of a vertical arrangement type, foreign matter can be discharged easily and with certainty with a simple configuration of the device, thus increasing reliability of the card reader.

No matter which arrangement type, vertical or horizontal, the card reader is applied to, since the present invention is configured such that the foreign matter discharge opening is provided at the wall surface of the frame to which foreign matter such as coins inserted into the device through the card inlet drops and located before the contacts carriage in the card insertion direction, foreign matter is discharged toward the outside of the device before contacting electronic components such as IC contacts. Therefore, a card reader in a simple configuration can be provided in which foreign matter can be discharged easily and with certainty whether the card reader is arranged vertically or horizontally. Thus, reliability thereof is increased.

Further, the present invention provides a card inlet with narrow inserting portions for accepting top and bottom edges of the card and a wider inserting portion for accepting the warp of the card. The gap dimension of the foreign matter discharge opening is set equal to or larger than that of the wider inserting portion to discharge all the foreign matter inserted into the device toward the outside through the foreign matter discharge opening which has a gap dimension larger than that of the wider inserting portion. Therefore, foreign matter will be discharged with certainty.

Furthermore, the present invention is configured such that the width dimension of the foreign matter discharge opening is larger than all kinds of currently used coins to discharge all of those outside of the device if coins are inserted in the device as foreign matter. Therefore, when inserted foreign matter is a coin, the coin can be discharged with certainty.

The shutter member for preventing foreign matter such as coins from entering is located inside the recess. The disabling means for disabling the shutter is positioned so that when insertion of the appropriate card is detected, the disabling means is actuated to disable (unlock) the shutter and thus allow the card to be fully inserted. The shutter member is locked in a blocking position until an insertion attempt with the card is detected. Thus the present invention prevents foreign matter, other than the appropriate cards having magnetically encoded data, from being inserted by mistake or on purpose.

The shutter member is positioned between the recess inlet and the contact block for IC cards. Therefore, the contact block for the IC card, which block is important and is a fragile component, is protected by the shutter member.

A magnetic head for detecting magnetic data on the card is positioned at one of the side guide portions which guide the card to be inserted. This magnetic head is positioned proximal of the shutter member in the card insertion direction, so that when a card is inserted a detection of the magnetic stripe occurs before the card reaches the shutter member. Upon detection of the insertion of the card having magnetic data, the shutter member is disabled and the card can be fully inserted. But in the absence of detecting the card, the shutter member remains locked and foreign matter other than a card having magnetic data, is prevented from entering.

An opening for discharging foreign matter such as coins is provided. The opening is positioned inside the recess portion at one or more of two planes of the frame, which planes are parallel to and perpendicular to a reading surface of the card. Therefore, if the manual card reader is arranged in either a horizontal or a vertical position, foreign matter such as coins that are inserted into the reader will be discharged.

The disabling means for disabling the blocking by the shutter member includes a solenoid that actuates a plunger which normally locks the shutter member. When the plunger is actuated, it is removed from its blocking state and the locking of the shutter member is disabled and the shutter member will move out of the way of the appropriate card.

BRIEF DESCRIPTION

In brief, in one embodiment there is disclosed a vertical card reader having an opening at the base thereof positioned in communication with the card insertion slot and positioned forward of the IC contacts of the contacts carriage used in reading the card. Accordingly, when foreign materials such as coins are inserted into the card passageway through the inlet slot for the card, they are discharged through this bottom opening without contacting or causing damage to electronic contacts and without building up so as to cause damage to a card that is inserted.

In another embodiment, a blocking mechanism for the card passageway prevents foreign material such as coins from being inserted. In this embodiment, when a card is inserted, a read head is appropriately positioned to sense the magnetic swipe of the card as the card is initially inserted. When such sensing occurs, the blocking member is pivoted out of the way so the card can be fully inserted into the card passageway and properly read by the card reader.

What is claimed is:

1. A card reader adapted to provide protection from insertion of foreign matter such as coins comprising:
   a frame having a front surface and a base surface,
   a card passageway having a card inlet at said front surface of said frame,
   said base surface being below said card inlet when the card reader is oriented to accept cards that are vertically inserted,
   a contacts carriage near a rear portion of said card passageway for contacting a card when said card is fully inserted,
   an opening in the base of said frame, said base opening being in communication with said card passageway at a location between said card inlet and said contacts carriage,
   insertion of foreign matter into said card inlet resulting in the foreign matter falling through said base opening without contacting said contacts;
   wherein said card inlet has a first portion having a thickness corresponding to a thickness of the IC card and a second wider portion with a thickness sufficiently larger to permit insertion of a warped card, a width dimension of said foreign matter discharge opening in the base of said frame being at least as large as the width of said second wider portion of said card inlet;
   wherein said contacts carriage is arranged to be shifted upwardly from a vertical center of said card passageway when an appropriate card is fully inserted in said reader.

2. The card reader of claim 1 further comprising a sidewall opening in said card reader, said sidewall opening being in communication with said card passageway at a location between said contacts carriage and said inlet to said card passageway, whereby when said card reader is in a horizontal position, foreign matter or coins inserted into said card inlet will be discharged through said side passageway without contacting said contacts of said contacts carriage.

3. The card reader of claim 1 wherein said foreign matter discharge opening in said base is larger than diameter a of largest anticipated foreign matter.

4. The card reader of claim 1 wherein tapered portions are provided at said foreign matter discharge opening.

5. The card reader of claim 1 wherein tapered portions are provided at said foreign matter discharge opening.

6. The card reader of claim 2 wherein said card is an IC card, and said contacts of said contacts carriage elastically contact a contact pattern on said IC card, and said contacts carriage retaining said contacts and moving upon the insertion of said IC card so that said contacts are brought into contact with said contact pattern on said IC card.

7. A card reader adapted to provide protection from the insertion of foreign matter such as coins comprising:
   a frame having a front surface and a base surface,
   a card passageway having a card inlet at said front surface of said frame,
   said base surface being below said card inlet when the card reader is oriented to accept cards that are vertically inserted,
   a head portion which records data on or reproduces data from a magnetic stripe on a card inserted into said passageway, said head portion being positioned above a center line of said card passageway,
   an opening in the base of said frame, said base opening being in communication with said card passageway at a location between said card inlet and said head portion,
   insertion of foreign matter into said card inlet resulting in the foreign matter falling through said base opening without contacting said contacts;
   wherein said card inlet has a first portion having a thickness corresponding to a thickness of the IC card and a second wider portion with a thickness sufficiently larger to permit insertion of a warped card, a width dimension of said foreign matter discharge opening in the base of said frame being at least as large as the width of said second wider portion of said card inlet;
   and wherein said contacts carriage is arranged to be shifted upwardly from a vertical center of said card passageway when an appropriate card is fully inserted in said reader.

8. In a card reader having a recess portion for manually inserting a card through a card inlet into a card passageway, the improvement comprising:
   a shutter member having a normal blocking state and an unblocking state, said shutter member when in said blocking state being positioned across the card passageway near said inlet to prevent foreign matter from being inserted into said card passageway; and
   a means responsive to detection of the insertion of a card into said passageway to switch said shutter member into said unblocking state to permit passage of the card into its fully inserted position;
   wherein said inlet has a first portion having a thickness corresponding to a thickness of the IC card and a second wider portion with a thickness sufficiently larger to permit insertion of a warped card, a width dimension of said foreign matter discharge opening in the base of said frame being at least as large as the width of said second wider portion of said inlet;
   wherein said contacts carriage is arranged to be shifted upwardly from a vertical center of said card passageway when an appropriate card is fully inserted in said reader.

9. The card reader of claim 8 wherein said card passageway extends along both sides of said recess to provide first and second guide portions for the card at both sides of said recess, and further comprising a magnetic head for detecting magnetic data on a card positioned at one of said guide portions to detect an inserted card prior to the inserted card abutting against said shutter member.

10. The reader of claim 9 having a frame and further comprising at least one opening for discharging foreign matter at one of two planes which are parellel to and perpendicular to a reading surface of said card.

11. The card reader of claim 9 wherein a switching means comprises a solenoid that drives a plunger which engages with said shutter for switching the state of said shutter.

* * * * *